US008867196B2

(12) United States Patent
Wahler

(10) Patent No.: US 8,867,196 B2
(45) Date of Patent: Oct. 21, 2014

(54) ONBOARD INFORMATION SYSTEM FOR VEHICLES

(75) Inventor: Torsten Wahler, Bad Dürrheim (DE)

(73) Assignee: Continental Automotive GmbH, Hannover (DE)

( * ) Notice: Subject to any disclaimer, the term of this patent is extended or adjusted under 35 U.S.C. 154(b) by 342 days.

(21) Appl. No.: 13/331,848

(22) Filed: Dec. 20, 2011

(65) Prior Publication Data

US 2012/0155006 A1 Jun. 21, 2012

(30) Foreign Application Priority Data

Dec. 20, 2010 (DE) ......................... 10 2010 055 203
Mar. 28, 2011 (DE) ......................... 10 2011 015 264

(51) Int. Cl.

*G07B 13/00* (2006.01)
*G07B 13/02* (2006.01)
*G07B 13/04* (2006.01)
*G06F 1/16* (2006.01)
*G07C 7/00* (2006.01)
*G07C 5/08* (2006.01)

(52) U.S. Cl.

CPC ................ *G07C 7/00* (2013.01); *G07C 5/0858* (2013.01)
USPC ................ 361/679.01; 361/679.02; 235/30 R

(58) Field of Classification Search

None
See application file for complete search history.

(56) References Cited

U.S. PATENT DOCUMENTS 4,644,368 A * 2/1987 Mutz ........................... 346/33 D
4,860,124 A * 8/1989 Adams .............................. 360/6
6,104,282 A 8/2000 Fragoso et al.
6,250,552 B1 * 6/2001 Hirasawa ...................... 235/475
6,366,450 B1 * 4/2002 Janicek .................... 361/679.41
6,381,133 B1 * 4/2002 Chen ........................ 361/679.42
6,392,677 B1 5/2002 Lais
6,400,561 B1 * 6/2002 Horton ..................... 361/679.58
6,437,815 B1 * 8/2002 Burkart .......................... 347/222
6,629,716 B2 * 10/2003 Shibata et al. .................. 296/70
7,831,756 B1 * 11/2010 Fils ............................... 710/303
2002/0085339 A1 * 7/2002 Hug .............................. 361/680
2004/0021763 A1 * 2/2004 Huegle .......................... 347/222

(Continued)

FOREIGN PATENT DOCUMENTS

DE 296 03 156 U1 4/1996
DE 195 45 537 A1 6/1996

(Continued)

OTHER PUBLICATIONS

DTCO® 1381 Rel. 1.3U—zuverlässig und effizient (Der digitale Tachograph von VDO); Continental Automotive GmbH (VDO—Eine Marke des Continental-Konzerns); 2010; Seiten 1 bis 12; www.dtco.vdo.de.

(Continued)

*Primary Examiner* — Adrian S Wilson

(74) *Attorney, Agent, or Firm* — Cozen O'Connor

(57) ABSTRACT

An onboard information system for vehicles, including a housing in which a computation unit and a first mass memory are arranged and are connected to one another for the purpose of data transfer. The system includes a support that can at least to some extent be moved out of the housing and which has a data interface for a second mass memory, which data interface is connected to the computation unit for the purpose of data transfer.

20 Claims, 6 Drawing Sheets

(56) References Cited

U.S. PATENT DOCUMENTS

| | | | | |
|---|---|---|---|---|
| 2004/0121645 | A1 * | 6/2004 | Postrel | 439/374 |
| 2005/0037671 | A1 | 2/2005 | Yamada et al. | |
| 2005/0052478 | A1 * | 3/2005 | Benzing et al. | 346/50 |
| 2005/0057634 | A1 * | 3/2005 | Huegle | 347/109 |
| 2006/0201073 | A1 * | 9/2006 | Kirner et al. | 52/79.1 |
| 2008/0027572 | A1 * | 1/2008 | Romoser | 700/94 |
| 2008/0059701 | A1 | 3/2008 | Esfandabadi | |
| 2008/0089547 | A1 * | 4/2008 | Young et al. | 381/386 |
| 2008/0106393 | A1 | 5/2008 | Bedell et al. | |
| 2008/0112118 | A1 * | 5/2008 | Osaka et al. | 361/681 |
| 2008/0215892 | A1 * | 9/2008 | Lindinger et al. | 713/189 |
| 2008/0225494 | A1 * | 9/2008 | Yang | 361/727 |
| 2008/0251577 | A1 * | 10/2008 | Kimmich et al. | 235/377 |
| 2009/0296006 | A1 * | 12/2009 | Campbell et al. | 348/837 |
| 2010/0053882 | A1 * | 3/2010 | Hayashi | 361/679.43 |
| 2010/0172683 | A1 * | 7/2010 | Wahler | 400/223 |
| 2010/0177474 | A1 * | 7/2010 | Wahler | 361/679.31 |
| 2010/0195279 | A1 * | 8/2010 | Michael | 361/679.41 |
| 2011/0188197 | A1 * | 8/2011 | Jackson | 361/679.41 |
| 2012/0233081 | A1 * | 9/2012 | Hishiki et al. | 705/317 |

FOREIGN PATENT DOCUMENTS

| | | | | |
|---|---|---|---|---|
| DE | 10 2004 030 869 | A1 | 1/2006 | |
| EP | 0 624 856 | A2 | 11/1994 | |
| EP | 652129 | A1 * | 5/1995 | B60K 35/00 |
| EP | 709683 | A1 * | 5/1996 | G01P 1/14 |
| EP | 0 918 222 | A1 | 5/1999 | |
| EP | 1 553 519 | A1 | 7/2005 | |
| EP | 1 103 928 | B1 | 1/2007 | |
| JP | 06333115 | A * | 12/1994 | G07C 5/00 |
| WO | WO 2008/054816 | A2 | 5/2008 | |

OTHER PUBLICATIONS

Vehicle Data Recorder VDR; Continental Automotive GmbH (VDO—Eine Marke des Continental-Konzerns); 2010; 1 Seite; http://www.vdo.de/generator/www/de/de/vdo/main/products_solutions/commercial_v . . . .

* cited by examiner

F - F

G - G

H - H

ONBOARD INFORMATION SYSTEM FOR VEHICLES

BACKGROUND OF THE INVENTION

1. Field of the Invention

The present invention relates to an onboard information system for vehicles, including a housing having a computation unit and a first mass memory which are connected to one another for the purpose of data transfer.

2. Description of the Related Art

Onboard information systems for vehicles, such as tachographs or toll appliances, are usually set up to store vehicle data and operating data for the vehicle, such as driving times, working hours, standby times and rest times for driver and codriver, distances travelled and service-specific parameters, such as engine speeds and other operating processes and events on the vehicle.

For the purpose of processing and storing the data, the onboard information system contains a computation unit and also a mass memory connected to the computation unit. In order to comply with statutory provisions, there may also be provision for such an onboard information system to comprise a printer that can be used to print legally prescribed reports, graphical speed logs, status and activity logs.

Besides complying with the legally prescribed data capture and storage, such onboard information systems are frequently used to store additional data, such as speeds recorded every second, odometer readings during vehicle stops and other vehicle parameters, such as engine speed profiles.

With the increasing demands on data storage by such systems and by additional functional requirements, there is now the problem that the storage capacity of the system is frequently not sufficient. In addition, reading large volumes of data from the system is often time-consuming.

SUMMARY OF THE INVENTION

It is an object of the present invention to provide an onboard information system for vehicles that solves or at least moderates the outlined problems. Such an onboard information system is thus intended to have a sufficiently large capacity for data storage. At the same time, the system is intended to allow the stored data to be read from the system as easily and quickly as possible.

An onboard information system for vehicles in accordance with present invention includes a housing in which a computation unit and a first mass memory are arranged and are connected to one another for the purpose of data transfer. The system furthermore includes a support that can at least to some extent be moved out of the housing. This support has a data interface for a second mass memory, which data interface is connected to the computation unit for the purpose of data transfer therewith, or the support is connected to the data interface at least such that they are arranged at a fixed interval relative to one another.

The data interface can be used to integrate a second mass memory, that is to say a supplementary memory augmenting the first mass memory, into the system to extend the storage capacity of the system. Thus, when necessary, it is firstly possible to use the second mass memory to extend the memory easily. In addition, it is possible to transfer the data stored on the second mass memory to another appliance by removing the second mass memory from the system. In this way, the second mass memory can, following removal from the system, be inserted into an external reader, for example, and the data can be read using the reader.

Since the data interface is arranged on the support that can at least to some extent be moved out of the housing, the second mass memory can be connected particularly easily to the data interface. To this end, the support that can be moved out can preferably be moved out of the housing to such an extent that the data interface is likewise moved out of the housing and is then easily accessible from the outside. In the operating state of the system in which the support is situated preferably completely in the interior of the housing, the data interface is not accessible. In this way, the second mass memory is protected particularly well from external influences, such as dust or water, by the housing during operation of the system. The support may be in the form of a drawer or a pivot element and, by way of example, may be guided in rails or by a hinge. It is then thus possible for the support to be pulled or pivoted and pushed or pivoted out of or into the housing (at least to some extent).

In one embodiment, the support has a receptacle for the second mass memory on the data interface, said receptacle being able at least to some extent to hold the second mass memory. The receptacle preferably has an opening through which the second mass memory can be inserted into the receptacle. Preferably, this opening in the receptacle is not facing a front of the housing. In that case, there is particularly no provision for the second mass memory to be pushed into the receptacle through a front element of the system, as is usual in the case of driver cards with a memory chip, for example.

In one embodiment, the front of the support can be moved out of the housing. This allows particular ease of use, particularly if the housing is a fitted housing installed up to a front element of the system, for example in a dashboard in the vehicle.

In one embodiment, the support has a storage chamber for holding printing material, such as printing paper, or another storage medium, preferably one which is corruption-proof and manipulation-proof. In a particularly favorable arrangement of the receptacle for the second mass memory, the receptacle is arranged above, below or at the side of a guide for printed documents.

Alternatively, an onboard information system for vehicles which comprises a housing in a computation unit and a first mass memory are arranged and are connected to one another for the purpose of data transfer, wherein the housing contains a receptacle for at least to some extent holding a second mass memory. In this case, provision is also made for the receptacle to have a data interface, connected to the computation unit, for the purpose of data transfer between the computation unit and the second mass memory, wherein the receptacle furthermore has an opening, which is not facing a front of the housing, for the insertion of the second mass memory into the receptacle.

Such an onboard information system according to the invention is suitable for being upgraded with a second mass memory by inserting this second mass memory into the receptacle and connecting it to the computation unit via the data interface. It is thus possible to extend the memory in the system when needed. At the same time, the second mass memory is safely protected against external influences by the housing. A further advantage is again that the second mass memory can be removed from the system for the purpose of reading the data stored in it and can be read using an external reader.

Further embodiments of the described onboard information systems according to the invention are illustrated below.

In one embodiment of the invention, the data interface has electrical contact elements for making electrical contact between the second mass memory and the data interface. This allows particularly safe, fast and reliable data transfer between the computation unit and the second mass memory.

In one embodiment, an interior of the housing, which contains particularly the data interface and possibly also the receptacle for the second mass memory, is sealed such that harmful penetration of dust and/or water into the interior of the housing can be largely prevented. For this purpose, sealing may be provided, such as rubber seals.

Preferably, the computation unit is set up to automatically recognize the second mass memory as soon as the latter is connected to the computation unit via the data interface. In addition, the computation unit is preferably set up to automatically write data to the second mass memory as soon as the second mass memory has been recognized by the computation unit. In particular, the computation unit may be set up to store continually arising vehicle data, such as engine speeds, speeds, the pressure of tires, or other operating data for the vehicle, on the second mass memory. For this purpose, provision may also be made for the system to be connected to a central onboard computer in the vehicle, which onboard computer is connected to a vehicle sensor system.

By way of example, the second mass memory may be a flash storage medium. In particular, it may be an SD card (Secure Digital memory card) or may be a CompactFlash card, a memory stick, a multimedia card, a SmartMedia card, a Solid State Floppy Disk Card, or an xD picture card. Such storage media have the advantage that they are inexpensive and in widespread use, which means that compatibility problems can largely be avoided.

A particularly simple design for the system can be achieved by virtue of the data interface being arranged on a printed circuit board or on a lateral arm of the printed circuit board. Such printed circuit boards are usually part of onboard information systems and carry central data lines and control lines for the system, said lines possibly being in the form of flexible lines or ribbon lines.

Provision may also be made for the data interface for the second mass memory to be connected to a serial channel of the computation unit for serial data transfer between the computation unit and the second mass memory. Frequently, a serial channel can be used to connect particularly large mass memories to the computation unit. The first mass memory, which can be set up exclusively to store legally prescribed data, may preferably be connected to a parallel channel of the computation unit for the purpose of parallel data transfer between the computation unit and the first mass memories.

In one further development of the onboard information system, said system incorporates a tachograph and/or a toll appliance. For this purpose, the computation unit is then thus set up to perform tachograph functions and/or toll functions.

The invention relates to an adapter for an onboard information system of the type proposed here for connecting the second mass memory to the data interface for the second mass memory. Such an adapter preferably comprises at least one mount element for the mass memory. Provision may also be made for the adapter to be designed to correspond to the receptacle for the second mass memory in the housing. Preferably, the adapter is designed such that a force-fit and/or form-fit connection can be made between the adapter and the receptacle. For this purpose, latching elements, rails, grooves, springs, or the like, may be provided on the receptacle and/or the adapter. A design of the receptacle which allows push-push locking is particularly advantageous. In addition, it is advantageous if the receptacle has a recessed grip designed on it to allow the adapter or the second mass memory to be easily grasped by a hand.

In one embodiment of the adapter, said adapter has electrical connecting elements for making an electrical connection between the data interface and the second mass memory.

In one further development of an onboard information system, the second mass memory can be connected to the data interface only by means of such an adapter. For this purpose, provision may be made, by way of example, for the receptacle for the second mass memory to be dimensioned such that an adapter needs to be used in order be able to connect the second mass memory securely to the data interface and possibly fix it thereon. In addition, provision may be made for the data interface to be designed such that an electrical connection between the data interface and the second mass memory is possible only by such an adapter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail below using specific exemplary embodiments which are shown in FIGS. 1 to 10 below, in which.

DETAILED DESCRIPTION OF THE PRESENTLY PREFERRED EMBODIMENTS

Figure 1:
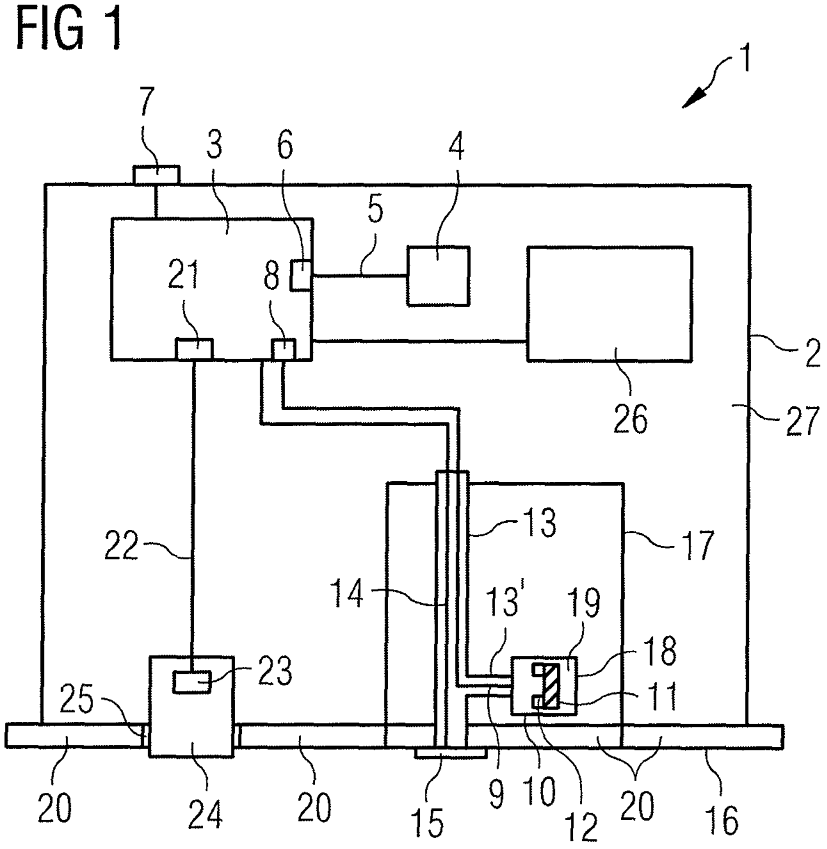
FIG. 1 is a specific embodiment of an onboard information system.

FIG. 1 schematically shows the design of a specific embodiment of an onboard information system 1 of the type proposed here. The onboard information system 1 comprises a housing 2 in which a computation unit 3 and a first mass memory 4 are arranged which are connected for the purpose of data interchange to a conductor 5 and via a parallel connection channel 6 of the computation unit 3 to one another.

The computation unit 3 is connected to a data interface 10 via a serial connection channel 8 and a further conductor 9. This data interface 10 can be used to connect a second mass memory 11 to the system 1. For this purpose, the data interface 10 has electrical contact elements 12 which can be used to electrically connect the second mass memory 11, for example a flash data memory in the form of an SD card, to the interface 10 for the purpose of transferring electrical signals containing encoded data/information between the computation unit 3 and the second mass memory 11 via the electrical conductor 9. The conductor 9 is arranged to some extent on a printed circuit board 13 and a lateral arm 13' of the printed circuit board 13 which is connected to the printed circuit board 13, said printed circuit board also having a further conductor 14 arranged on it which connects the computation unit 3 to operator control elements 15. The operator control elements 15 are arranged on a front 16 of the housing 2.

The data interface 10 is arranged on a support 17 which is in the form of a drawer and can be moved out of the housing 2 until the data interface is situated outside of the housing 2. On the data interface 10, the support 17 has a receptacle 18 for the second mass memory 11 with an opening 19 for inserting the second mass memory 11 into the receptacle 18. The opening 19 points vertically upward and is therefore not facing the front 16 of the housing 2, but rather in this example is accessible only from above. Hence, the data interface 10 is particularly not accessible through a front panel 20 of the system 1. In addition, there is no possibility of the second mass memory 10 being inserted into the receptacle 18 or removed therefrom through the front panel 20.

In order to insert the second mass memory 11 into the receptacle 18 and in order to remove the second mass memory 11 from the receptacle 18, the front of the support 17, which is in the form of a drawer, needs to be pulled out of the housing 2 until the opening 19 in the receptacle 18 is situated outside of the housing 2 and is therefore accessible. The computation unit 3 is set up to automatically recognize the second mass memory 11 as soon as it is connected to the computation unit 3 via the data interface 10, and to automatically write data to it as soon as the second mass memory 11 has been recognized by the computation unit 3 and as soon as an appropriate security code has been input using the operator control element 15. This security code may be driver-specific or vehicle-specific or else may have been issued specifically for a single memory card. Provision may also be made for said security code to have to be input only once in order to enable the system 1 for memory extension with a second mass memory 11.

The computation unit 3 also has a second serial connecting channel 21 which is connected to a further data interface 23 via a conductor 22, the computation unit 3 being set up to use this further data interface 23 to write to and read a chip card 24, such as a driver card, workshop card or control card. The front panel 20 has a slot-like passage opening 25 through which the chip card 24 can at least to some extent be pushed into the housing 2 until contact is made between the card 24 and the further data interface 23.

The onboard information system 1 also comprises an integrated toll system 26 ("onboard unit" or "OBU" for short), connected to the computation unit 3, for automatic billing in a charge collection or toll system. For this purpose, the integrated toll system comprises a GPS locating system, a GSM module and also a memory which stores vehicle-specific details and also position data for tollable traffic routes. The computation unit 3 is set up to perform toll functions, such as calculation of toll charges arising during the journey and actuation of the GSM module to send messages to a toll control center.

The computation unit 3 is also equipped with a connection element 7 for transferring data to be processed and/or stored to the computation unit 3. In particular, the computation unit can be connected to a central onboard computer in a vehicle via the connection element 7.

The onboard information system 1 is furthermore designed as a digital tachograph. For this purpose, the computation unit 3 is set up to perform all the relevant and legally prescribed tachograph functions. In particular, the computation unit 3 is programmed to transfer appropriate vehicle and operating data to the first mass memory 4, the second mass memory 11 and the chip card 24 (driver card, control card) and to store them thereon. The data relate particularly to continually arising vehicle data and operating data, such as working hours, rest times, standby times, and also interruptions therein, distances covered, driving data and speeds.

In addition, the computation unit 3 is set up to store various other measurement data, for example from a vehicle sensor system, on the second mass memory 11, particularly measurement data from the engine (temperature of cooling water and oil, numbers of revolutions, torques), from the gearbox (shift operations, numbers of revolutions, temperature), from the tires (air pressure), fuel consumption, manner of driving by the driver, acceleration, deceleration and also fault or warning reports produced by the central onboard computer.

On account of the practically unlimited storage capacity of the second mass memory 11, said data can be stored on the second mass memory 11 with a high level of time resolution, i.e. in only very short intervals of time (for example a few minutes or seconds). This allows, by way of example, detailed driver, journey and vehicle profiles to be produced and, in particular, a state of a vehicle and possibly incidental repairs or maintenance measures to be ascertained.

The housing is sealed according to current statutory provisions. In addition, the system is designed as a fitted appliance according to ISO 7736, so that the system can be fitted into an appropriate installation pit, for example in a dashboard in a driver's cab in a vehicle. In the appropriately fitted state of the system, an interior 27 of the housing 2, which comprises particularly the computation unit 3, the first mass memory 4, the toll system 26, the data interface 10 and the second mass memory 11 and also the data interface 23 for the chip card 24 and also portions of the support 17, is protected against harmful external influences, such as dust and water, in accordance with current statutory provisions. For this purpose, particularly the front panel 20 of the housing 2 is sealed in accordance with protection class IP54.

As can be seen from the figures, the system 1 shown in FIG. 1 comprises, as legally prescribed at present, a printer for creating paper documents with legally prescribed details, particularly regarding travel and rest times and also odometer readings and speeds of travel. Alternatively or in addition, other storage media could also be provided in order to produce documents which are as corruption-proof and manipulation-proof as possible, such as write-once CDs.

FIGS. 2 to 10 below present the exemplary embodiment of the invention which is shown in FIG. 1, or portions of this exemplary embodiment, schematically and from different perspectives. In this context, recurring features are provided with the same reference symbols.

Figure 2:
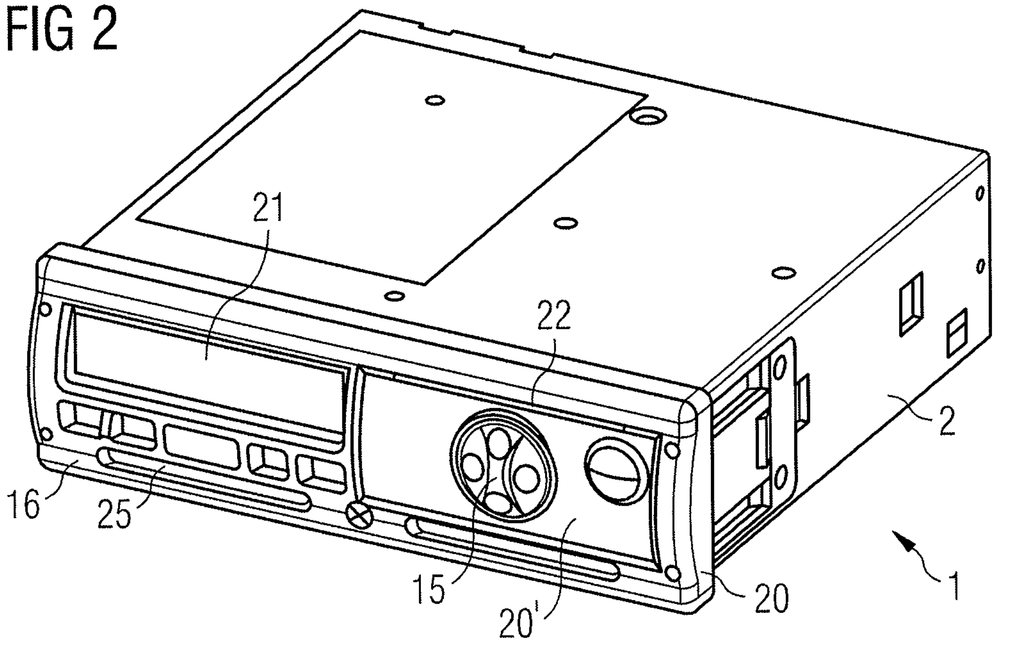
FIGS. 2 and 3 show the exemplary embodiment shown in FIG. 1 in a view from obliquely above.
Figure 3:
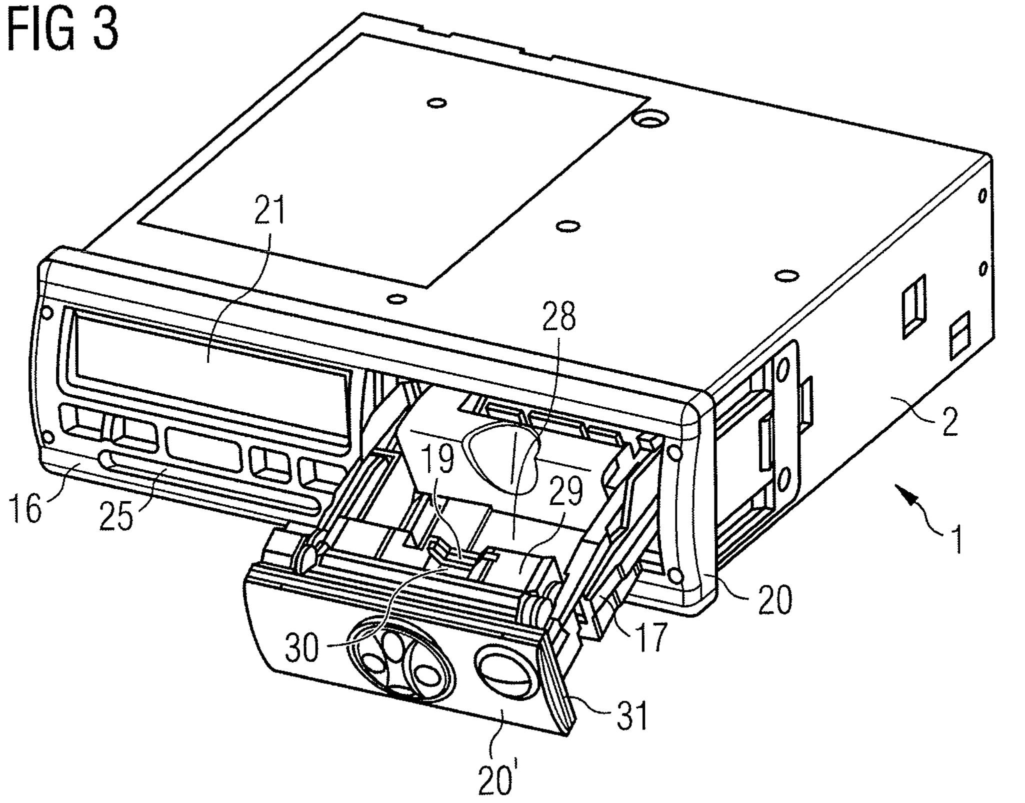

FIGS. 2 and 3 schematically show the onboard information appliance 1 shown in FIG. 1 in a view from obliquely above. It is possible to see particularly the housing 2, the front 16 of which has the front element 20 arranged on it, which furthermore partially covers four lateral faces of the housing 2 which adjoin the front 16. The front element 20 has the operator control elements 15, a display 21 and the passage opening 25 for inserting the chip card 24 arranged on it.

In addition, in a separate portion 20', the front panel 20 is connected directly to the support 17, so that the support can be pulled out from the interior 27 of the housing 2 through the front panel 20 in the manner of a drawer, as shown in FIG. 3. In an alternative exemplary embodiment, the support 17 is connected to the housing by a hinge and can be pivoted out of the interior 27 of the housing 2. That portion 20' of the front panel which is associated with the support 17 is provided with an opening 22 for the output of printed documents. In addition, the support 17 has a storage chamber 28 for printing material, such as a roll of paper, in the form of a depression in the support 17. This depression 28 is connected to the opening 22 for the output of the paper via a guide 29 for printed documents which is likewise designed as a depression in the carrier 17. The guide 29 contains a recessed grip 30 which contains the opening 19 in the receptacle 18 for the second mass memory 11.

The edge of the portion 20' of the front panel 20 has a seal element 31, for example comprising rubber, which largely seals the housing in the fitted state against dust and water when the support 17, as FIG. 2 shows, has been pushed into the housing 2. When the support 17, as FIG. 3 shows, has been pulled out of the interior 27 of the housing 2 to the extent that the opening 19 in the receptacle 18 for the second mass memory 11 is accessible, the second mass memory 11 can, when needed, be very easily inserted into the receptacle 2 (to extend the memory of the system 1) or removed therefrom (to read data stored on the memory 11). The positioning of the receptacle 18 in the interior 27 inside of the housing 2 nevertheless largely protects the second mass memory 11 against harmful external influences such as moisture and dust. In addition, the arrangement of the receptacle 18 below the guide 29 allows unimpeded output of paper.

Figure 4:
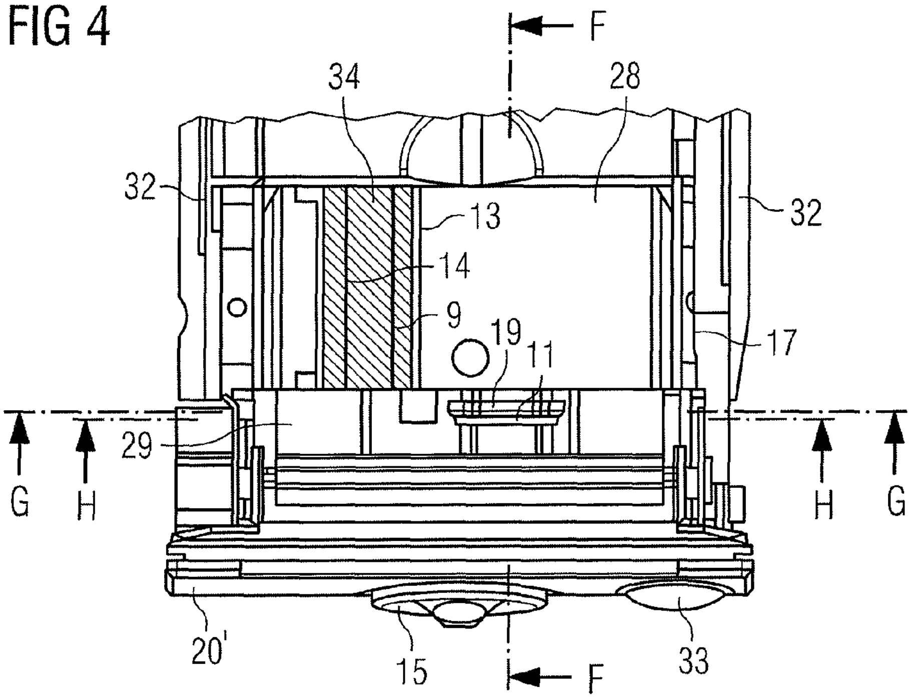
FIG. 4 is a support from the system shown in FIG. 1.

FIG. 4 schematically shows the support 17 with the portion 20' of the front panel 20 which is mounted on the front of the support 17 in a view from above. The figure denotes sectional planes F, G, H which are shown schematically in FIGS. 5, 6 and 7. It is also possible to see two lateral guide rails 32 on the support which guide the support 17 inside correspondingly designed cut-outs in the housing 2. In addition, a further operator control element 33 is shown on the front 20', said operator control element being able to be used to manually unlock a locking mechanism on the support 17 before the support 17 is pulled out of the housing 2. The printed circuit board 13 runs along an underside of the storage chamber 28 for the printing paper. The printed circuit board has a flexible line 34 arranged on it which incorporates particularly the lines 9 and 14, which connect the computation unit 3 to the data interface 10 and to the operator control element 15. The printed circuit board 13 is explained in more detail with reference to FIG. 8.

Figure 5:
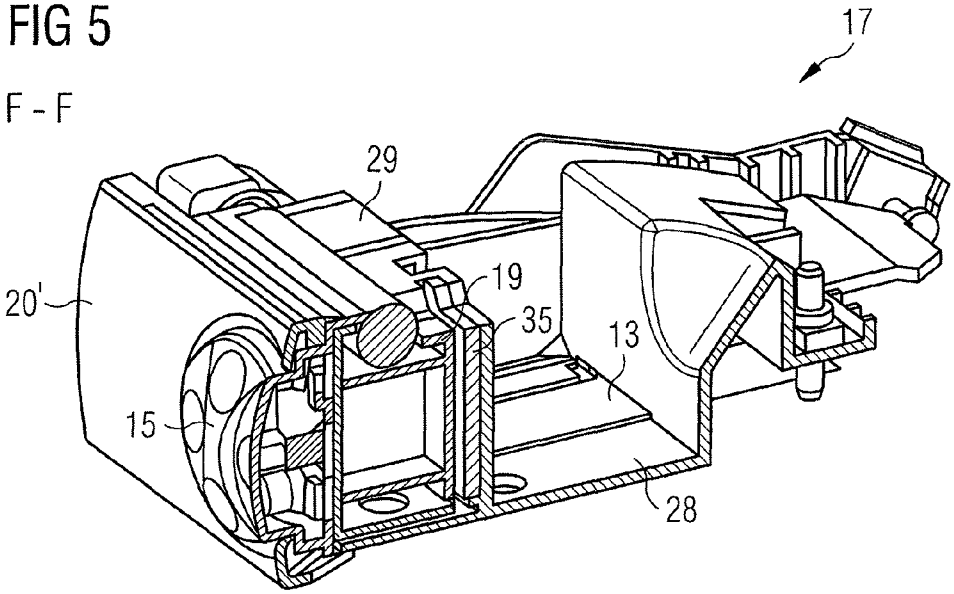
FIGS. 5 to 7 are sectional planes from the support shown in FIG. 4.
Figure 6:
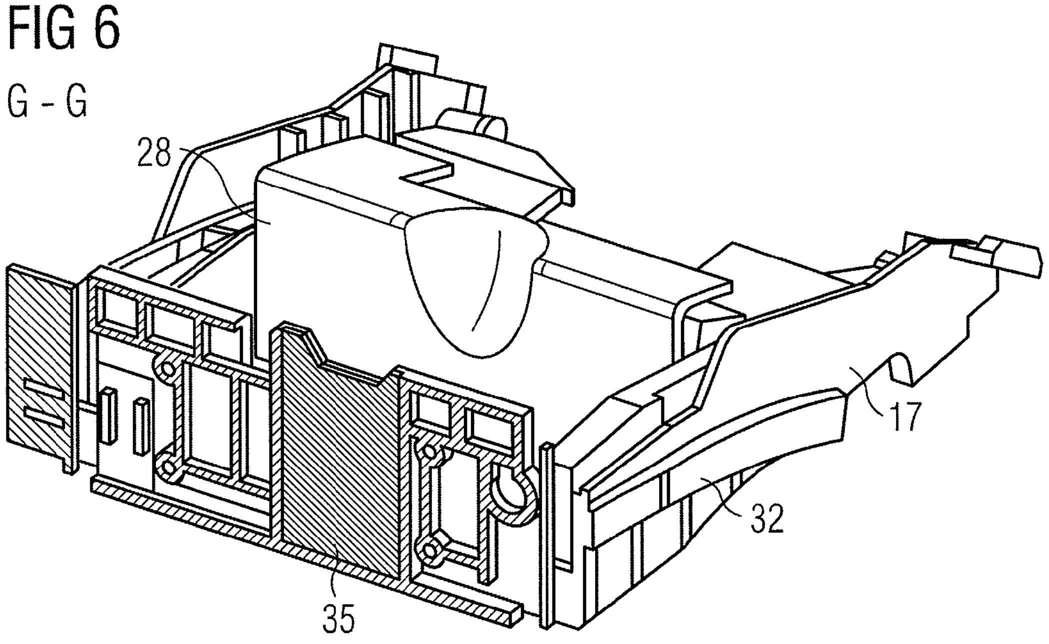
Figure 8:
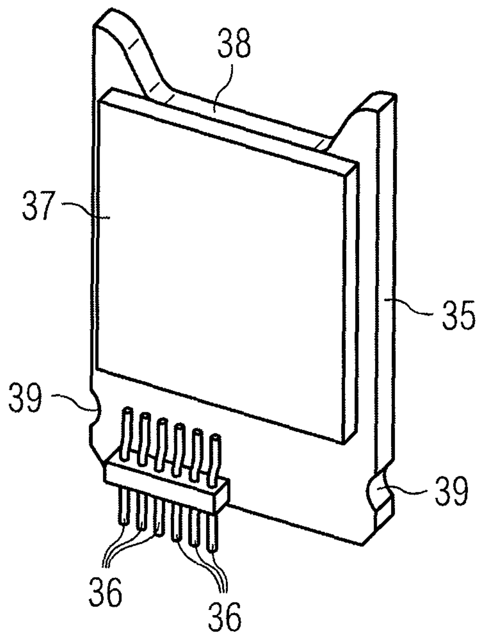
FIGS. 8 and 9 show an adapter for the system shown in FIG. 1.
Figure 9:
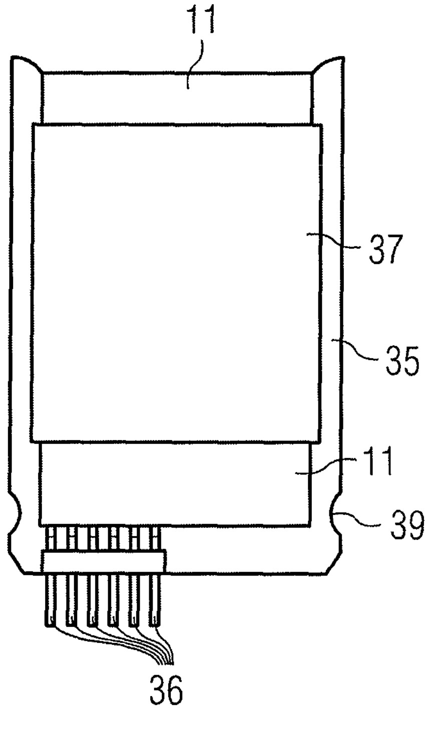

In addition, FIGS. 5 and 6 show an adapter 35 which has been pushed through the opening 19 into the receptacle 18 for the second mass memory, which is shown in detail in FIGS. 8 and 9.

Figure 7:
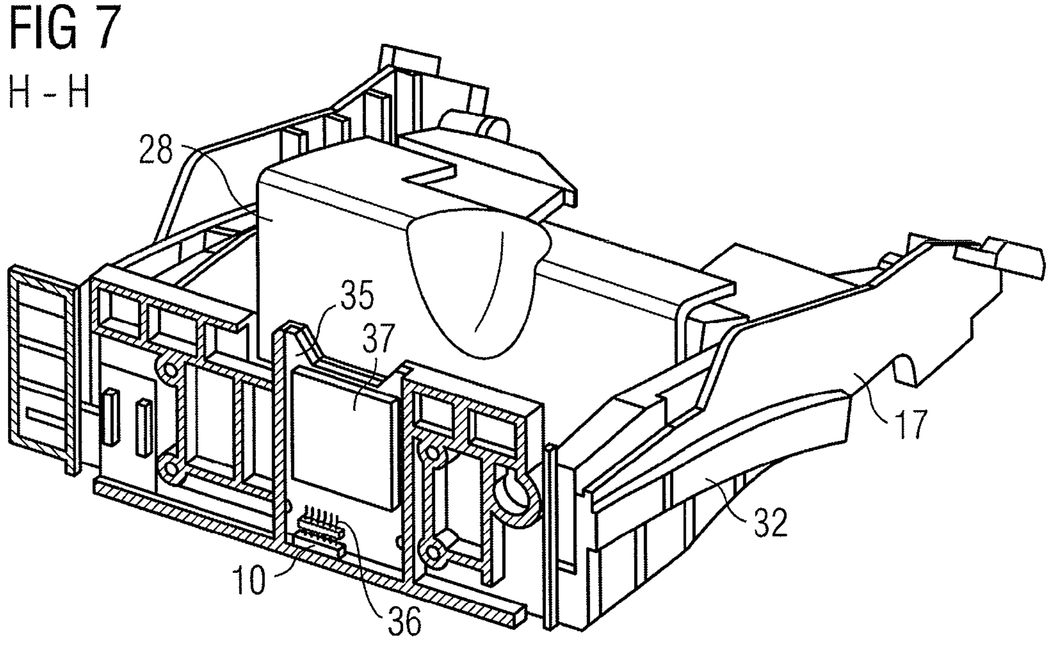

FIG. 7 shows the data interface 10, the electrical contact elements 12 of which are electrically conductively connected to electrical intermediate contact elements 36 of the adapter. It is also possible to see a mount element 37 on the adapter 35 which can be used to mechanically fix the second mass memory 11 in the receptacle 18. In order to be able to extend the shown exemplary embodiment of the system 1 with the second mass memory 11, the adapter 35 is thus necessary, since without it the mass memory 11 can be neither connected to the data interface 10 nor securely fixed in the receptacle 18. In this case, it is also possible, in principle, for the adapter to be permanently integrated in the support or even connected to the support by a material to material bond.

As FIGS. 8 and 9 show, the top of the adapter 35 has a recessed grip 38 to make it easier to grasp the second mass memory 11 by a hand. In addition, lateral faces of the adapter 35 incorporate latching elements 39 in the form of indentations for the purpose of securely fixing the adapter 35 in the receptacle 18 in the support 17, which for its part has corresponding latching elements in the form of elastic spring elements.

Figure 10:
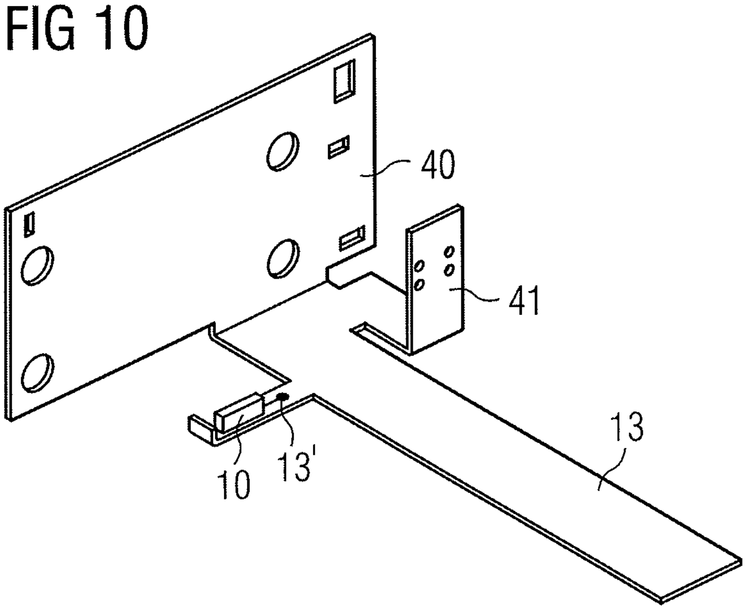
FIG. 10 is a printed circuit board from the system shown in FIG. 1.

FIG. 10 schematically shows the printed circuit board 13 in the system 1, the lateral arm 13' of which has the data interface 10 arranged on it. In addition, the printed circuit board has a front panel 40 on which the operator control elements 15 can be mounted, and also a motor plate 41 on which a printing element for printing the paper documents can be mounted.

The system 1 shown here thus particularly has the advantage that it can easily be upgraded using the adapter. To produce the exemplary embodiment shown in FIGS. 1 to 10, a conventional onboard information system needs to be modified such that the printed circuit board 13 is fitted with a lateral arm 13' having the data interface 10, the receptacle 18 is made in the support 17 and the computation unit 3 is connected to the data interface 10 via the conductor 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An onboard vehicle information system, comprising:

a computation unit;

a first mass memory connected to the computation unit for data transfer;

a housing in which the computation unit and the first mass memory are arranged;

a printed circuit board having a front panel to receive operator control elements, a data interface for a second mass memory, and a motor plate to receive a printing element; and a support moveable at least partially out of the housing having the printed circuit board and the data interface for a second mass memory, the data interface is connected to the computation unit for data transfer.

2. The system of claim 1, wherein the support further comprises a receptacle on the data interface for holding the second mass memory, the receptacle comprises an opening for the insertion of the second mass memory into the receptacle.

3. The system of claim 2, wherein the opening in the receptacle for the second mass memory is not facing a front of the housing.

4. The system as claimed in claim 1, wherein the front of the support is moveable out of the housing.

5. The system as claimed in claim 2, wherein the support has a storage chamber to hold printing material.

6. An onboard information system for vehicles, comprising:

a computation unit;

a first mass memory connected to the computation unit for data transfer;

a housing in which the computation unit and the first mass memory are arranged;

a printed circuit board having a front panel to receive operator control elements, a data interface for a second mass memory, and a motor plate to receive a printing element; and a receptacle connected to the computation unit for holding the second mass memory, the receptacle having a data interface arranged on the printed circuit board for data transfer between the computation unit and the second mass memory, wherein the receptacle further comprises an opening for insertion of the second mass memory into the receptacle, the opening is not facing a front of the housing.

7. The system of claim 6, wherein the data interface has electrical contact elements for making electrical contact between the second mass memory and the data interface for the purpose of data transfer between the computation unit and the second mass memory via the contact elements.

8. The system of claim 6, wherein an interior of the housing, which contains the receptacle for the second mass memory, is sealed to stop dust and water from penetrating the interior.

9. The system of claim 6, wherein the computation unit automatically recognizes the second mass memory connected to the data interface and automatically transfers data to the second mass memory.

10. The system of claim 6, wherein the computation unit is set up to store at least one of continually arising vehicle data and operating data in the second mass memory.

11. The system as claimed in claim 6, wherein the second mass memory is a flash storage medium.

12. The system as claimed in claim 6, wherein the receptacle for the second mass memory is arranged one of above, below, or at a side of a guide for printed documents.

13. The system as claimed in claim 6, wherein the data interface is arranged on one of the printed circuit board and a lateral arm of the printed circuit board.

14. The system as claimed in claim 6, wherein the data interface is connected to a serial channel of the computation unit for serial data transfer between the computation unit and the second mass memory.

15. The system as claimed in claim 6, wherein the first mass memory is connected to a parallel channel of the computation unit for parallel data transfer between the computation unit and the first mass memory.

16. The system as claimed in claim 6, wherein the computation unit is performs at least one of tachograph functions and toll functions.

17. An adapter for a system comprising:

a computation unit;

a first mass memory connected to the computation unit for data transfer;

a printed circuit board having a front panel to receive operator control elements, a data interface for a second mass memory, and a motor plate to receive a printing element;

a housing in which the computation unit and the first mass memory are arranged; and a support moveable at least to some extent out of the housing having the printed circuit board having the data interface for a second mass memory, which data interface is connected to the computation unit for data transfer connecting the second mass memory to the data interface, wherein the adapter comprises at least one mount element for the second mass memory.

18. The adapter from claim 17, further comprising electrical connecting elements for making an electrical connection between the data interface and the second mass memory.

19. The adapter from one of claim 17, wherein the adapter is corresponds to a receptacle in the housing for the second mass memory to make one of a form-fit and force-fit connection between the adapter and the receptacle.

20. A method for extending the storage capacity of a system comprising:

a first mass memory connected to the computation unit for data transfer;

a housing in which the computation unit and the first mass memory are arranged;

a printed circuit board having a front panel to receive operator control elements, a data interface for a second mass memory, and a motor plate to receive a printing element; and a support moveable at least to some extent out of the housing having the data interface for the second mass memory, which data interface is connected to the computation unit for data transfer, the method comprising:

connecting a second mass memory to the data interface; and transferring data from the computation unit to the second mass memory.

* * * * *